US012348940B2

(12) United States Patent
Sira et al.

(10) Patent No.: US 12,348,940 B2
(45) Date of Patent: Jul. 1, 2025

(54) ON-DEVICE LOUDSPEAKER REFERENCE RESISTANCE DETERMINATION

(71) Applicant: Cirrus Logic International Semiconductor Ltd., Edinburgh (GB)

(72) Inventors: Sandeep P. Sira, Gilbert, AZ (US); Philip B. J. Clarkin, Austin, TX (US); Roberto Napoli, Milan (IT)

(73) Assignee: Cirrus Logic, Inc., Austin, TX (US)

( * ) Notice: Subject to any disclaimer, the term of this patent is extended or adjusted under 35 U.S.C. 154(b) by 345 days.

(21) Appl. No.: 17/816,489

(22) Filed: Aug. 1, 2022

(65) Prior Publication Data

US 2024/0048903 A1 Feb. 8, 2024

(51) Int. Cl.
*H03G 11/00* (2006.01)
*H04R 3/00* (2006.01)
*H04R 29/00* (2006.01)

(52) U.S. Cl.
CPC .......... *H04R 3/007* (2013.01); *H04R 29/001* (2013.01)

(58) Field of Classification Search
CPC .............................. H04R 3/007; H04R 29/001
USPC ...................................................... 381/55, 96
See application file for complete search history.

(56) References Cited

U.S. PATENT DOCUMENTS 8,817,995 B2 8/2014 Huijser et al.
9,525,945 B2 12/2016 Magrath et al.
2010/0329055 A1* 12/2010 Hsu ........................ G11C 17/16 365/201
2012/0188150 A1* 7/2012 Shirouzu .............. G09G 3/3233 345/76
2014/0004810 A1* 1/2014 Cohen .................. H04B 17/102 455/115.3
2014/0169571 A1* 6/2014 Polleros ................... H04R 9/06 381/55
2014/0180859 A1* 6/2014 Cline ..................... G06Q 20/12 705/26.1
2016/0071567 A1* 3/2016 Fujita ................... G11C 13/004 365/158
2017/0094408 A1* 3/2017 Napoli ..................... H03G 3/20
2019/0110145 A1* 4/2019 Lawrence ............... H03F 3/181
2020/0252034 A1* 8/2020 Chadha ...................... H03F 3/45
2021/0204043 A1* 7/2021 Christoph .............. H04R 3/007

FOREIGN PATENT DOCUMENTS

NL 3121961 * 7/2015

* cited by examiner

*Primary Examiner* — William J Deane, Jr.
(74) *Attorney, Agent, or Firm* — Norton Rose Fulbright US LLP

(57) ABSTRACT

This disclosure provides techniques for determining a reference resistance of a loudspeaker, such as in a mobile device. The reference resistance value may be used, among other applications, for speaker protection by reducing overdrive of the loudspeaker beyond safe temperature, which could damage the loudspeaker, while allowing driving of the loudspeaker closer to safety limits to improve performance of the loudspeaker. In a first aspect, a method of audio device monitoring includes applying a first signal to a loudspeaker; measuring a voltage and a current for the loudspeaker while applying the first signal to the loudspeaker; and determining a reference resistance for the loudspeaker based on the voltage and the current. Other aspects and features are also claimed and described.

20 Claims, 6 Drawing Sheets

ON-DEVICE LOUDSPEAKER REFERENCE RESISTANCE DETERMINATION

FIELD OF THE DISCLOSURE

The instant disclosure relates to audio circuitry. More specifically, portions of this disclosure relate to methods and apparatus for protecting loudspeakers.

BACKGROUND

Many products include audio circuitry for reproducing sounds. For example, audio circuitry in a mobile phone may be used to reproduce game sounds in game applications, playback ringtones to indicate an incoming call, and/or output audio as part of a telephone or video call. Other example products include tablet computing devices, laptops, televisions, alarm systems, and video cameras. The quality of audio generated by the audio circuitry may be related to the quality of audio signals received by the audio circuitry, the performance of the audio circuitry, and/or the responsiveness of the loudspeaker that is driven by the audio circuitry. Many products have size restrictions that limit the physical size and shape of the loudspeaker, which impacts the sound quality and/or sound volume output by the product. Regardless of size and product constraints, any loudspeaker will have limits regarding maximum supply voltage, maximum supply current, maximum displacement, and/or maximum ambient temperature. When a loudspeaker is driven by the audio circuitry beyond these limits, the audio quality may be reduced and the loudspeaker may be damaged.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

Audio circuitry may include circuitry for and perform techniques for protecting loudspeakers. Speaker protection, and other algorithms executed by audio circuitry, make use of a reference resistance value for the loudspeaker in controlling operation of the loudspeaker. The reference resistance value, referenced as $R_0$, for a loudspeaker is a resistance measured at a reference temperature, referenced as $T_0$. The reference temperature $T_0$ for the reference resistance value $R_0$ may be the resistance measured at room temperature (e.g., 23 degrees Celsius). The reference resistance value $R_0$ is used by the audio circuitry in determinations such as estimating a temperature of the loudspeaker or components of the loudspeaker. Audio circuitry according to aspects of this disclosure may allow determination of the reference resistance value $R_0$ by the device using current and voltage measurements of the loudspeaker. The ability to recalibrate the reference resistance value $R_0$ allows the device to recharacterize the loudspeaker as the loudspeaker characteristics change through use, repair, and/or replacement of the loudspeaker or associated components. Maintaining a more accurate reference resistance value $R_0$ allows the loudspeaker to be operated closer to maximum performance with reduced risk of damage to the loudspeaker.

An accurate on-device technique for determining a reference resistance of a loudspeaker may be particularly advantageous in devices in which the loudspeaker operates in a restricted environment, such as in a mobile device. Operating the loudspeaker at maximum performance may be important because a higher performance loudspeaker may be too large for the device form factor. Thus, any safety margin in operating the loudspeaker due to an inaccurate reference resistance value may unnecessarily reduce performance of a loudspeaker that may already be smaller than desired. For example, variation in $R_0$ between loudspeakers, even of the same model and manufacture, may be up to or beyond +/−10%. If an incorrect reference resistance $R_0$ is used in a thermal protection algorithm for protecting the speaker, the thermal protection may be insufficient if the $R_0$ value is estimated too high and the output may be unnecessarily restricted if the $R_0$ value is estimated too low. A preprogrammed value for the loudspeaker reference resistance, in view of the variation of +/−10%, may result in undesired damage or lower performance out of the loudspeaker. A reference resistance value $R_0$ may be measured for each device during assembly and the device preprogrammed with the measured value. However, the stored value may become invalid when the stored value becomes corrupt, the speaker is replaced, or the memory storing the stored value is replaced. Recalibration of the loudspeaker in such situations is not possible because the device does not have a reliable measurement of a reference temperature. Aspects of this disclosure may improve upon these and other techniques by providing an accurate reference resistance value that improves performance of the loudspeaker.

According to one embodiment, a method includes applying a first signal to a loudspeaker; measuring a voltage and a current for the loudspeaker while applying the first signal to the loudspeaker; and determining a reference resistance for the loudspeaker based on the measured voltage and the measured current while applying the first signal to the loudspeaker. In certain embodiments, the first signal may be a tone signal, a direct current (DC) signal, a broadband signal, or other voltage stimulus.

In certain embodiments, determining the reference resistance may include determining a thermal model for the loudspeaker. The thermal model may be determined based on the measured voltage and the measured current, with the thermal model being represented by one or more parameters reflecting different aspects of the relationship between temperature and speaker characteristics. An adaptive filter may be used to estimate a thermal model for the loudspeaker. The reference resistance may be determined by determining parameters for the thermal model for the loudspeaker by adapting an adaptive filter based on a response of the loudspeaker to the first signal. The reference resistance is then based on at least one parameter of the adaptive filter. Adapting the adaptive filter may include: applying an input power signal to the adaptive filter corresponding to input power applied to the loudspeaker during the application of the first signal as the stimulus to the loudspeaker, and adapting a first parameter and a second parameter of the adaptive filter based on a resistance of the loudspeaker determined from the voltage and the current for the loudspeaker, wherein the first parameter corresponds to a scaling factor for a relationship between resistance and power in the thermal model and the second parameter corresponds to a time constant for the relationship between resistance and power in the thermal model, with determining the reference resistance being based on the first parameter.

In certain embodiments, determining the reference resistance may be based on a relationship between ambient temperature and resistance (e.g., as reflected in a predetermined linear relationship between temperature and resistance, a look-up table (LUT) with corresponding temperature and resistance values, or other structures or functions for defining the relationship between ambient temperature and resistance). This relationship between ambient temperature and resistance may reflect a thermal model. Determining the reference resistance in these embodiments may include, for example, measuring the voltage and the current for the loudspeaker while applying the first signal to the loudspeaker. The determination may include: measuring a first voltage and a first current at a first time; and measuring a second voltage and a second current at a second time after the first time; and determining the reference resistance may include: determining a first resistance at the first time corresponding to a first temperature; determining a second resistance at the second time corresponding to a second temperature; determining an ambient temperature value based on a difference between the first resistance and the second resistance; and determining the reference resistance based on the ambient temperature value and the first resistance.

In some embodiments, the determination of the reference resistance may be part of a recalibration of the loudspeaker, with the method further including: determining a first excursion estimate based on at least one of a voltage between or a current through two terminals of the loudspeaker; applying a second signal as a second stimulus to the loudspeaker; measuring at least one of a second voltage between or a second current through the two terminals of the loudspeaker while applying the second signal as the stimulus to the loudspeaker; determining a second excursion estimate based on at least one of a second voltage between or a second current through two terminals of the loudspeaker; and determining to execute the recalibration of the loudspeaker based on the first excursion estimate and the second excursion estimate meeting a criteria.

In certain embodiments, the first signal and the second signal comprise a high frequency tone configured to monitor an impedance in an inductive region of the loudspeaker. For example, the impedance of the speaker may be measured and then a frequency higher than a resonance frequency of the loudspeaker may be selected based on how much variation in impedance exists due to excursion.

In certain embodiments, the method may further include receiving audio data for reproduction by the loudspeaker; generating an audio signal based on the audio data; modifying the audio signal based on the reference resistance to determine an output signal, wherein the modification is based on a thermal protection algorithm; and applying the output signal to the loudspeaker.

In certain embodiments, determining the reference resistance is performed without reference to a temperature value.

The method may be embedded in a computer-readable medium as computer program code comprising instructions that cause a processor to perform the steps of the method. In some embodiments, the processor may be part of an information handling system including a first network adaptor configured to transmit data over a first network connection of a plurality of network connections; and a processor coupled to the first network adaptor, and the memory. In some embodiments, the network connection may couple the information handling system to an external component, such as a wired or wireless docking station.

According to another embodiment, an apparatus may include an audio controller configured to perform steps including: applying a first signal to a loudspeaker; measuring a voltage and a current for the loudspeaker while applying the first signal to the loudspeaker; and determining a reference resistance for the loudspeaker based on the voltage and the current.

In certain embodiments, determining the reference resistance comprises determining a thermal model for the loudspeaker based on the voltage and the current.

In certain embodiments, determining the reference resistance comprises determining parameters for the thermal model for the loudspeaker by adapting an adaptive filter based on a response of the loudspeaker to the first signal; and adapting the adaptive filter comprises: applying an input power signal to the adaptive filter corresponding to input power applied to the loudspeaker during the application of the first signal as the stimulus to the loudspeaker, and adapting a first parameter and a second parameter of the adaptive filter based on a resistance of the loudspeaker determined from the voltage and the current for the loudspeaker, wherein the first parameter corresponds to a scaling factor for a relationship between resistance and power in the thermal model and the second parameter corresponds to a time constant for the relationship between resistance and power in the thermal model, with the reference resistance being based on at least the first parameter.

In certain embodiments, measuring the voltage and the current for the loudspeaker while applying the first signal to the loudspeaker includes measuring a first voltage and a first current at a first time; and measuring a second voltage and a second current at a second time after the first time; determining the reference resistance includes determining a first resistance at the first time corresponding to a first temperature; determining a second resistance at the second time corresponding to a second temperature; determining an ambient temperature value based on a difference between the first resistance and the second resistance and a predetermined linear relationship between resistance and temperature; and determining the reference resistance based on the ambient temperature value and the first resistance.

In certain embodiments, the audio controller is further configured to perform steps including determining an audio signal for reproduction by the loudspeaker; modifying the audio signal based on the reference resistance to determine an output signal, wherein the modification is based on a thermal protection algorithm; and applying the output signal to the loudspeaker.

According to some embodiments, a mobile device includes a loudspeaker; a memory; and an audio controller coupled to the memory, the audio controller also coupled to the loudspeaker and configured for outputting sounds through the loudspeaker based on audio data stored in the memory. The audio controller of the mobile device may be configured to perform any of the aspects of the methods or techniques described herein. In some embodiments, the audio controller may include circuitry for audio processing, such as digital-to-analog converters (DACs), analog-to-digital converters (ADCs), audio amplifiers, and/or filters. The audio controller may be integrated on a die or substrate with other analog and/or digital components, such as one or more central processing unit (CPU) cores, graphics processing unit (GPU) cores, and/or memory.

As used herein, "loudspeaker" (also referred to as a "speaker" or "speaker driver") refers to a component that converts electrical signals to a corresponding sound represented as a series of pressure waves that can be perceived as a sound by humans or otherwise measured by electronic devices such as a microphone. One example loudspeaker includes a diaphragm, which is driven by a voice coil suspended relative to a magnet. An analog signal representing the audio to be reproduced may be applied to the voice coil to drive the loudspeaker to generate pressure waves that are perceived as sound. Loudspeakers may be stand-alone components, or may be integrated into electronic devices. For example, a loudspeaker may be included in an enclosure of a mobile device (e.g., a mobile phone, a tablet computing device, or a laptop). As another example, a loudspeaker may be included in a mobile speaker unit, which also houses a power supply (e.g., a battery), audio circuitry for driving the loudspeaker, and wireless connectivity circuitry (e.g., a personal area network (PAN) connection such as Bluetooth, a local area network (LAN) connection such as Wi-Fi, or a wide area network (WAN) connection such as 5G NR) for receiving audio signals to be processed by the audio circuitry.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one audio controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
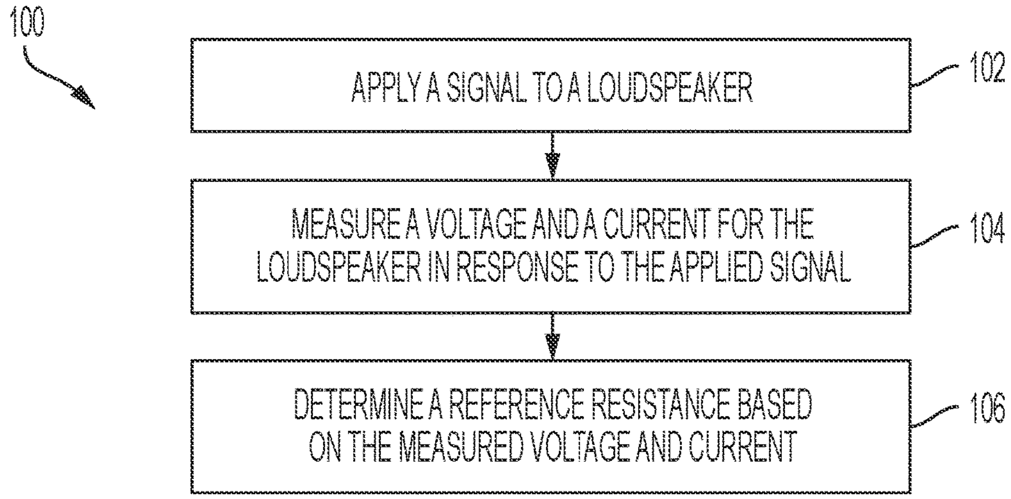
FIG. 1 is a flow chart illustrating an example method for determining a reference resistance of a loudspeaker according to some embodiments of the disclosure.

FIG. 1 is a flow chart illustrating an example method for determining a reference resistance of a loudspeaker according to some embodiments of the disclosure. A method 100 includes, at block 102, applying a signal to a loudspeaker. A tone of specified frequency, amplitude, and duration is output to the speaker to allow voltage V and current I measurements to be recorded. The signal may be, for example, a high-frequency tone configured to monitor an impedance in an inductive region of the loudspeaker. In another example, the signal may be a tone signal, a direct current (DC) signal, a broadband signal, or other voltage stimulus.

At block 104, a voltage and a current are measured for the loudspeaker in response to the applied signal of block 102. A measurement circuit may be coupled to the loudspeaker through two terminals at the loudspeaker. A voltage may be measured across the two terminals while applying the signal of block 102. A current may be measured through the loudspeaker between the two terminals while applying the signal of block 102.

At block 106, a reference resistance value is determined based on the measured voltage and measured current. By using the measured values, the reference resistance may be determined without the need for a temperature reference. This method allows the reference resistance value to be determined on-chip, despite there being no accurate temperature measurements available on-chip. The reference resistance value may be determined from the measured values according to the example calculations described in more detail with reference to FIGS. 2-7 and embodiments described herein. For example, the reference resistance may be determined by determining parameters of a thermal model representing a relationship between resistance and temperature for the loudspeaker as described in the example embodiments of FIG. 2 and FIG. 3. As another example, the reference resistance may be determined by using a predetermined relationship between resistance and temperature for the loudspeaker as described in the example embodiments of FIG. 4 and FIG. 5.

Figure 2:
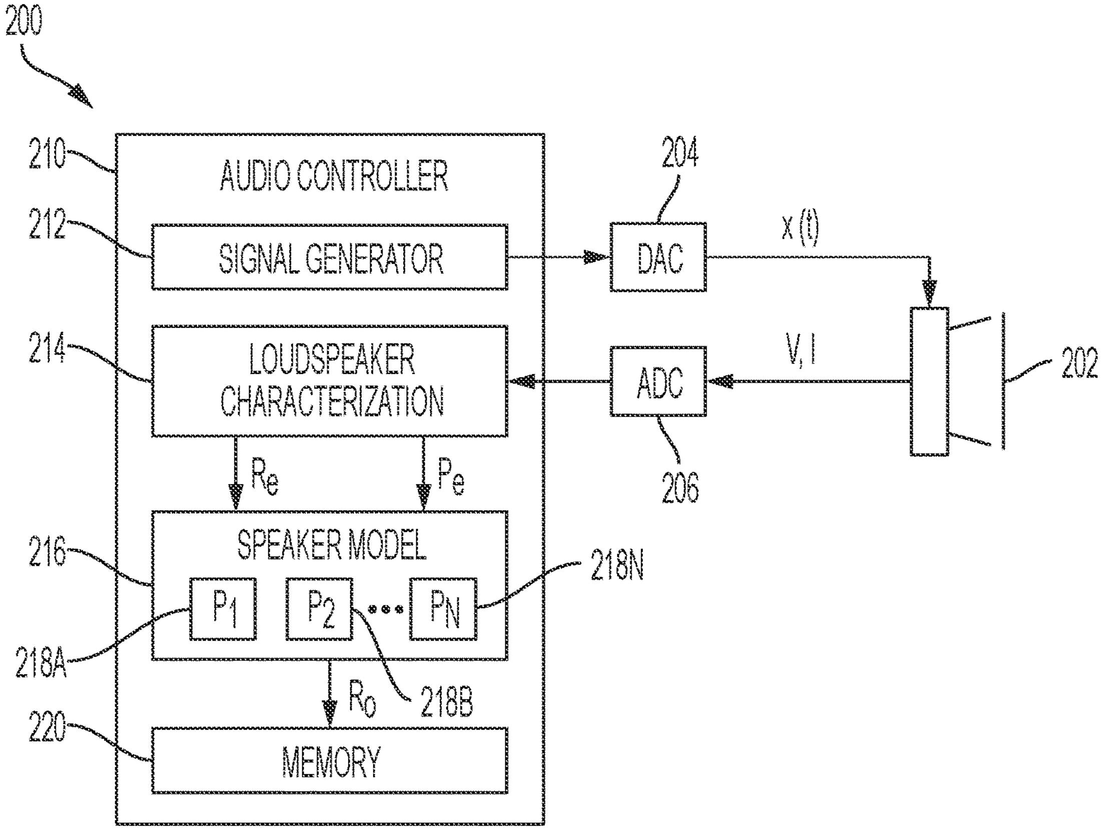
FIG. 2 is a block diagram illustrating an example audio controller for determining a reference resistance of a loudspeaker using a thermal model according to some embodiments of the disclosure.

FIG. 2 is a block diagram illustrating an example audio controller for determining a reference resistance of a loudspeaker using a thermal model according to some embodiments of the disclosure. A system 200 includes an audio controller 210 coupled to a loudspeaker 202 through two terminals, with a digital-to-analog converter (DAC) 204 coupled to a first terminal and an analog-to-digital converter (ADC) 206 coupled to a second terminal. The audio controller 210 may include a signal generator 212 configured to control DAC 204 to output a signal x(t), which may be a tone signal. The audio controller 210 may include loudspeaker characterization 214 configured to receive a voltage value V and a current I value from ADC 206. The V, I values measured from loudspeaker 202 may be analog values, which are converted to digital signals by ADC 206 and provided to audio controller 210. The x(t) signal provided to loudspeaker 202 may be an analog signal, which is converted from a digital signal by DAC 204 and provided to loudspeaker 202. In the shown configuration of FIG. 2, audio controller 210 may include only digital circuitry. In some embodiments, the audio controller may include analog domain circuitry and be a mixed signal controller, such as when the DAC 204 and ADC 206 are incorporated into the audio controller 210.

The reference resistance value determination may be calculated from the measured voltage V and measured current I values. The loudspeaker characterization 214 may determine resistance Re(t) and power Pe(t) over a period of time based on multiple V, I values. A change in resistance Re(t) and power Pe(t) may be fitted to a thermal model, and the parameters of the model are estimated. The speaker model 216 may receive the resistance Re(t) and power Pe(t) signals and determine one or more parameters 218A-N of a thermal model representing the loudspeaker 202. The reference resistance value $R_0$ may be derived from one or more of the model parameters 218A-N. The reference resistance value $R_0$ may then be stored in memory 220. The value $R_0$ may be stored in a register, a dynamic random access memory (DRAM) or other dynamic memory, or a static random access memory (SRAM) or other static memory. The reference resistance value $R_0$ may be retrieved from memory 220 for use in operations including excursion protection, temperature protection, other protection functions relating to loudspeaker 202, and/or other functions.

Figure 3:
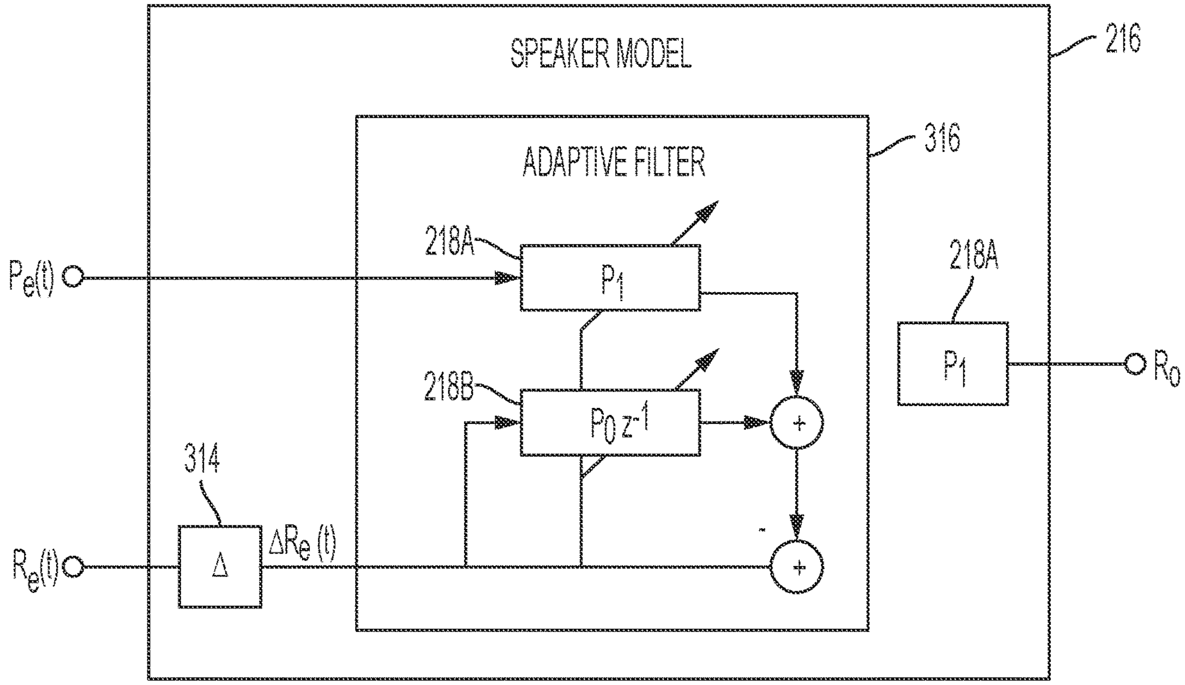
FIG. 3 is a block diagram illustrating an example audio controller with an adaptive filter for determining a thermal model according to some embodiments of the disclosure.

FIG. 3 is a block diagram illustrating an example audio controller with an adaptive filter for determining a thermal model according to some embodiments of the disclosure. The speaker model 216 may be implemented with an adaptive filter for estimating parameters for a thermal model of the loudspeaker 202. The speaker model 216 may receive the resistance Re(t) and power Pe(t) signals. The resistance Re(t) value may be input to a difference block 314 to determine a change in resistance between two resistance values at two different times in the resistance Re(t) signal. The output of the difference block 314 is a resistance change ΔRe(T) signal. The adaptive filter 316 may receive the resistance change ΔRe(t) signal and the power Pe(t) signal and model the relationship in the loudspeaker 202 of the resistance ΔRe(t) and power Pe(t) signals.

The change in resistance is related to the input power by the equation:

$$\Delta R_e(t) = \frac{R_0}{\mathrm{mc}/\alpha} P_e(t) \circledast \exp^{-\frac{t}{R_c mc}}.$$

This equation may be considered in the form of the following equation:

$$\Delta R_e(t) = P_e(t) \circledast h(t),$$

wherein the loudspeaker 202 response h(t) is represented by the filter equation:

$$h(t) = \frac{R_0}{\mathrm{mc}/\alpha} \exp^{-\frac{t}{R_c mc}}.$$

System identification techniques may be used to determine the parameters of the filter equation. The reference resistance value may be determined from the filter equation parameters by the equation:

$$P_1 = \frac{R_0}{\mathrm{mc}/\alpha}.$$

The adaptive filter 316 may estimate the filter equation h(t) representing loudspeaker 202 through two parameters 218A, 218B. The first parameter 218A, described as $P_1$, may correspond to a scaling factor for a relationship between resistance and power in the thermal model. The second parameter 218B, described as $P_0$, which is the coefficient in the value $P_0Z^{-1}$, corresponds to a time constant for the relationship between resistance and power in the thermal model. The adaptive filter 316 may vary the values of parameters 218A, 218B over time as the resistance Re(t) and power Pe(t) signals are received to improve the accuracy of the adaptive filter in representing the thermal model of the loudspeaker 202. The first parameter 218A may be used to determine the reference resistance value $R_0$ output from the speaker model 216. Although the example of FIG. 3 describes the change in resistance and power being fitted to a thermal model, other fitting methods with different numbers of parameters may be used to model the response of the loudspeaker 202.

Figure 4:
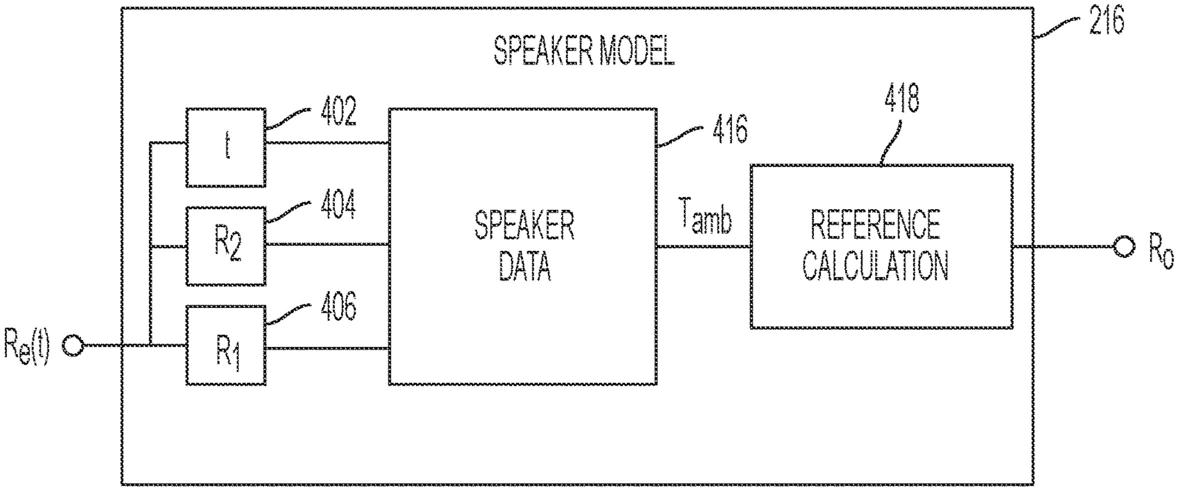
FIG. 4 is a block diagram illustrating an example audio controller using speaker data for a predetermined relationship between characteristics of a loudspeaker to determine a reference resistance according to some embodiments of the disclosure.
Figure 5:
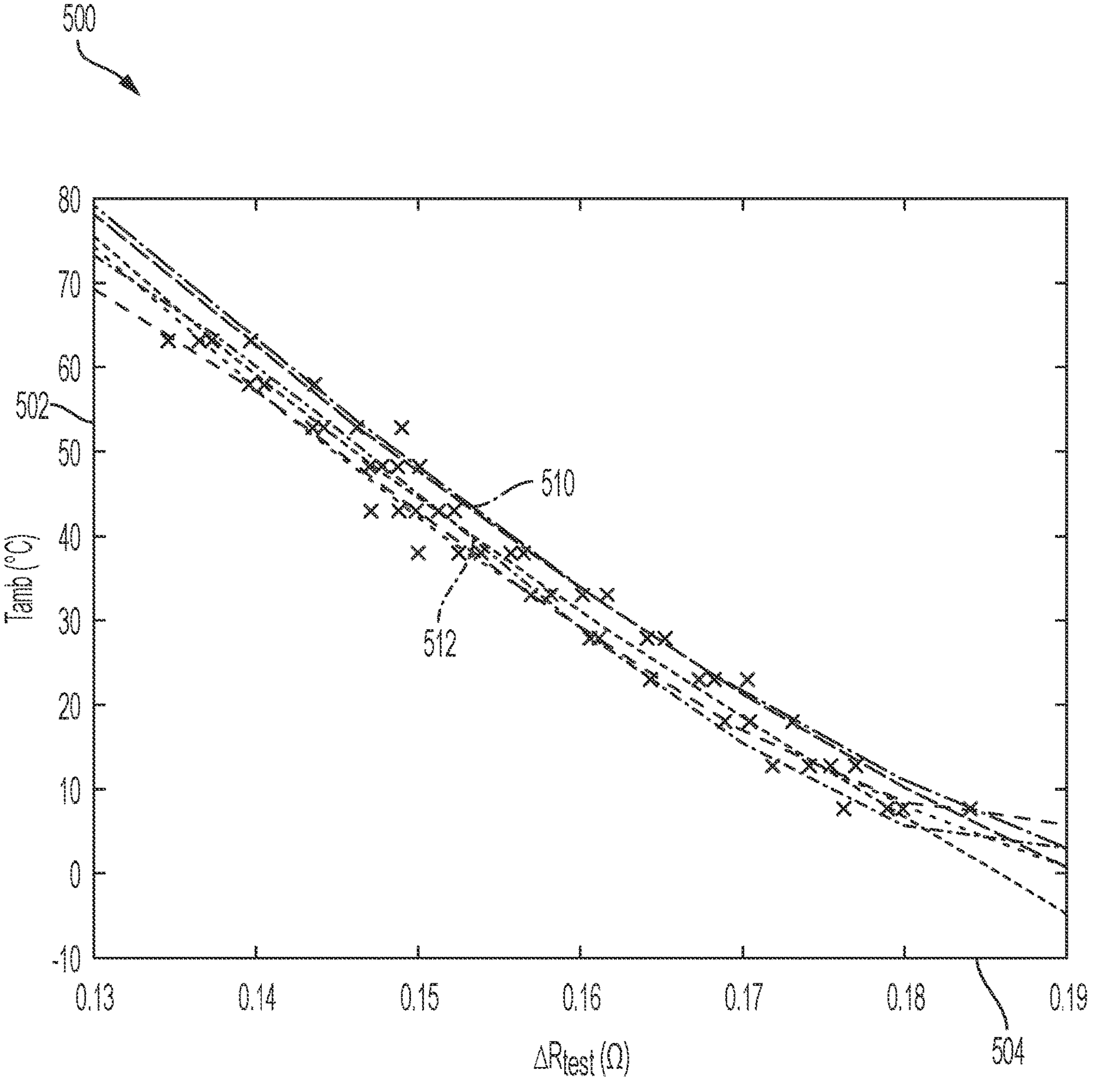
FIG. 5 is a graph illustrating an example predetermined relationship between characteristics of a loudspeaker according to some embodiments of the disclosure.

The reference resistance may alternatively or additionally be determined by using a predetermined relationship between resistance and temperature for the loudspeaker as described in the example embodiments of FIG. 4 and FIG. 5. FIG. 4 is a block diagram illustrating an example audio controller using speaker data for a predetermined relationship between characteristics of a loudspeaker to determine a reference resistance according to some embodiments of the disclosure. A speaker model 216 receives the resistance Re(t) signal determined from measured voltage V and measured current I values at a first time (e.g., $V_1$, $I_1$), a second time (e.g., $V_2$, $I_2$), and additional times. Blocks 402, 404, and 406 may be used to store individual resistance values $R_1$ 406 and $R_2$ 404 measured a time t 402 apart. A change in resistance from $R_1$ 406 to $R_2$ 404 over time t may be used as input to speaker data 416.

Power dissipated in the loudspeaker 202 reduces as ambient temperature increases, which may be reflected in increasing resistance over time. The relationship between resistance and ambient temperature can be characterized for one speaker or a population of speakers at varying ambient temperatures to generate a predetermined relationship between the characteristics reflected in a curve of $T_{amb}/(\Delta R_{test})$, in which $\Delta R_{test}$ is the single value change in resistance (e.g., $R_2$ 404-$R_1$ 406). In some embodiments, a stimulus may be played to the loudspeaker 202 and a change in resistance $\Delta R_{test}$ computed between a beginning and end of a test corresponding to the stimulus. The $R_1$ 406 value may correspond to a $R_{amb}$ value at the beginning of the test; and the $R_2$ 404 value may correspond to a $R_{final}$ at the end of the test. The $\Delta R_{test}$ value is determined over the test time t 402 and $T_{amb}$ is the starting ambient temperature.

An example predetermination relationship for a population of speakers is shown in FIG. 5. FIG. 5 is a graph illustrating an example predetermined relationship between characteristics of a loudspeaker according to some embodiments of the disclosure. A graph 500 shows $\Delta R_{test}$ values on x-axis 504 and ambient temperature $T_{amb}$ values on y-axis 502. A relationship for a first speaker is shown in line 510; and a relationship for a second speaker is shown in line 512. One of the relationships of lines 510 or 512 may be chosen for modeling the loudspeaker 202 based on, for example, identifying a speaker associated with line 510 or line 512 to be similar to loudspeaker 202 in one or more characteristics. In some embodiments, a relationship for modeling loudspeaker 202 may be determined by combining relationships of line 510, line 512, and/or additional lines, such as by averaging line 510 and line 512.

Referring back to FIG. 4, an output of speaker data 416 is an ambient temperature $T_{amb}$ corresponding to the input values from blocks 402, 404, 406. Speaker data 416 may output the ambient temperature $T_{amb}$ by referencing a look-up table (LUT) representing the relationships similar to those shown in FIG. 5. Speaker data 416 may alternatively output the ambient temperature $T_{amb}$ by using parameters for a linear or polynomial relationship to calculate the ambient temperature $T_{amb}$. The ambient temperature $T_{amb}$ may be provided to reference calculation 418, which determines the reference resistance value $R_0$ from the ambient temperature $T_{amb}$. The reference calculation 418 may determine the reference resistance value $R_0$ based on the equation:

$$R_0 = \frac{R_{amb}}{[1 + \alpha(T_{amb} - T_0)]}.$$

Figure 6:
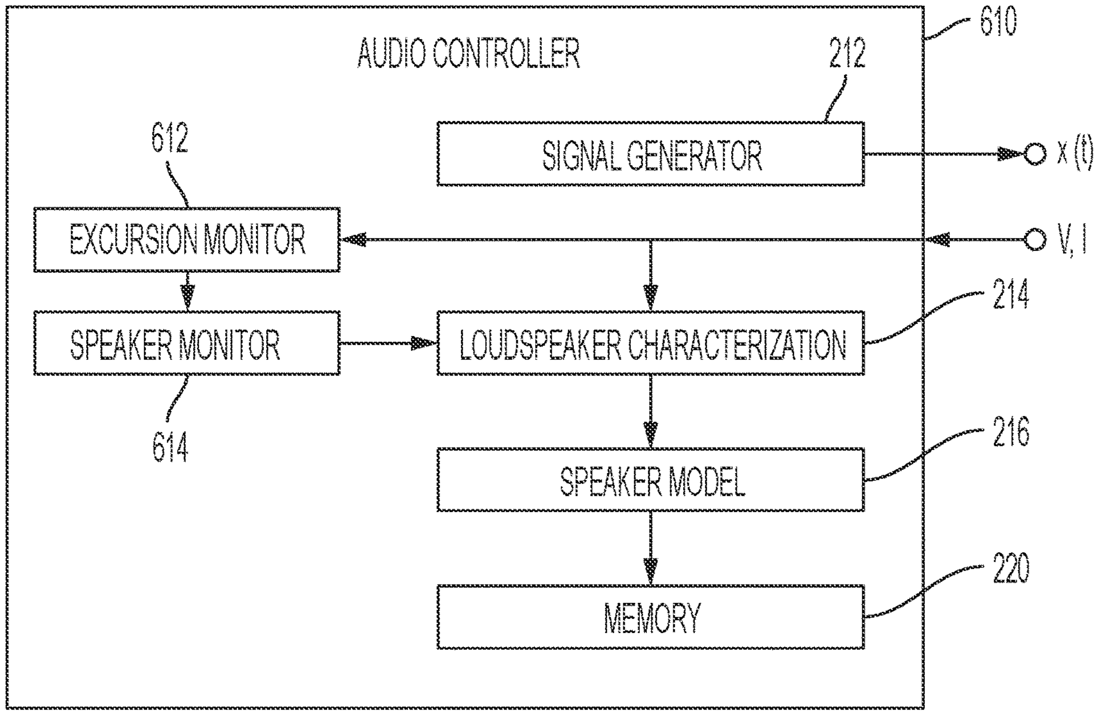
FIG. 6 is a block diagram illustrating an example audio controller with speaker protection functionality according to some embodiments of the disclosure.

The reference resistance value may be used by other functionality within the audio controller, as shown in the examples of FIG. 6. FIG. 6 is a block diagram illustrating an example audio controller with speaker protection functionality according to some embodiments of the disclosure. An audio controller 610 may include an excursion monitor 612 and speaker monitor 614 for determining when to recalibrate the reference resistance value $R_0$ for the loudspeaker 202. For example, the excursion monitor 612 may receive the measured voltage V and measured current I values, along with loudspeaker characterization 214. The speaker monitor 614 may receive excursion determinations from excursion monitor 612 and determine when a monitored excursion meets certain criteria. For example, a threshold may be applied to an excursion level to determine if the loudspeaker 202 excursion exceeds a normal amount by a certain amount. As another example, a machine learning algorithm may be applied to an excursion level to determine if the loudspeaker 202 is operating out of normal parameters. When the speaker monitor 614 detects a change in the loudspeaker 202, the speaker monitor 614 may trigger a recalibration process by activating loudspeaker characterization 214 to determine a new reference resistance value $R_0$ by speaker model 216 for storage in memory 220.

In some embodiments, the loudspeaker 202 may be monitored during operation by injecting a high-frequency tone as stimulus to monitor the impedance in the inductive region of the loudspeaker 202. A variation of this impedance may be converted to an excursion estimate based on a characterized transfer function. This excursion estimate is used to generate an excursion level for the given stimulus. When the excursion estimate changes more than a threshold amount, the change may indicate the loudspeaker 202 and/or components coupled to the loudspeaker 202 (such as a mainboard) have been replaced. In such circumstances, the reference resistance value $R_0$ may be recalibrated through a process such as described with reference to FIG. 2, FIG. 3, FIG. 4, or FIG. 5.

Figure 7:
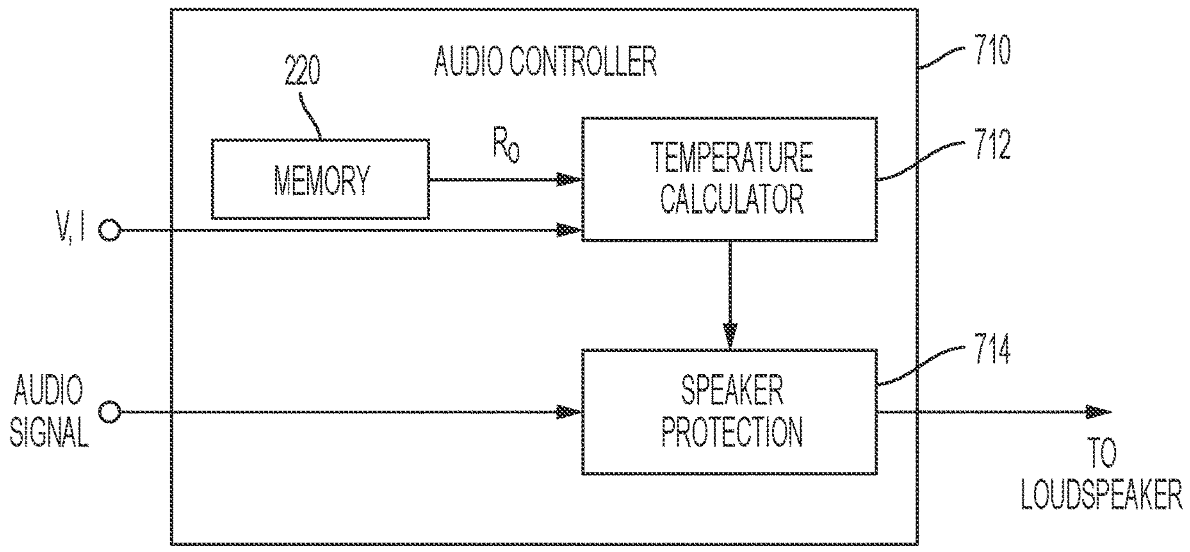
FIG. 7 is a block diagram illustrating an example audio controller with excursion protection using a reference resistance value according to some embodiments of the disclosure.

The reference resistance value $R_0$ may be used for excursion protection, temperature protection, or other functions. FIG. 7 is a block diagram illustrating an example audio controller with excursion protection using a reference resistance value according to some embodiments of the disclosure. Audio controller 710 may include a memory 220 storing the reference resistance value $R_0$ for retrieval by temperature calculator 712, which determines a temperature T for the loudspeaker 202 based on the stored $R_0$ value and received voltage V and current I input values, which may be a real-time value determined during operation of the loudspeaker 202 in reproducing sounds from the audio signal. The audio signal for reproduction by the loudspeaker 202 is input to the audio controller 710, which is processed by circuitry including speaker protection 714 (which modifies the audio signal to prevent or reduce the likelihood of the loudspeaker 202 exceeding a maximum temperature $T_{MAX}$, which may be specified by the loudspeaker manufacturer). The circuitry provides an output signal to drive the loudspeaker 202, in which the output signal is modified to protect the loudspeaker 202 from excessive excursion and/or operating temperature.

The speaker protection 714 may use a resistance R value determined from measured voltage V and measured current I values to estimate a current temperature from the equation:

$$R=R_0(1+\alpha(T-T_0))$$

in which $R_0$ is the reference resistance value (determined, for example, according to the embodiments herein), T is the temperature of the voice coil in the loudspeaker 202, and $T_0$ is the reference temperature (corresponding to the reference resistance value $R_0$). The temperature T of the voice coil in the loudspeaker 202 may thus be determined by speaker monitor 714 from a measured R value (which is based on the measured voltage V and the measured current I), the determined reference resistance value $R_0$ retrieved from memory 220, and the reference temperature $T_0$ (e.g., a constant value which may be 23 degrees Celsius).

The speaker protection 714 may protect the loudspeaker by adjusting an output level of the audio signal to be reproduced, such as by changing a gain on the audio signal. The speaker protection 714 may receive signals $V_{spk}$ and $I_{spk}$ indicative of a monitored voice coil drive voltage $V_{spka}$ and voice coil current $I_{spka}$. The speaker protection 714 may then determine a voice coil resistance $R_e$. A voice coil temperature $T_{vc}$ may be determined from the estimated voice coil resistance $R_e$ and the reference resistance $R_0$. A loudspeaker power dissipation Pd may be determined from $V_{spk}$ and $I_{spk}$ (or from a combination of one of $V_{spk}$ and $I_{spk}$ with the voice coil resistance $R_e$). A target gain control value may be derived based on the voice coil power dissipation $P_d$ and the voice coil temperature $T_{vc}$. This target gain control value may be used directly as a gain control signal for controlling an amplifier that amplifies the audio signal into a drive signal for the loudspeaker 202.

Figure 8:
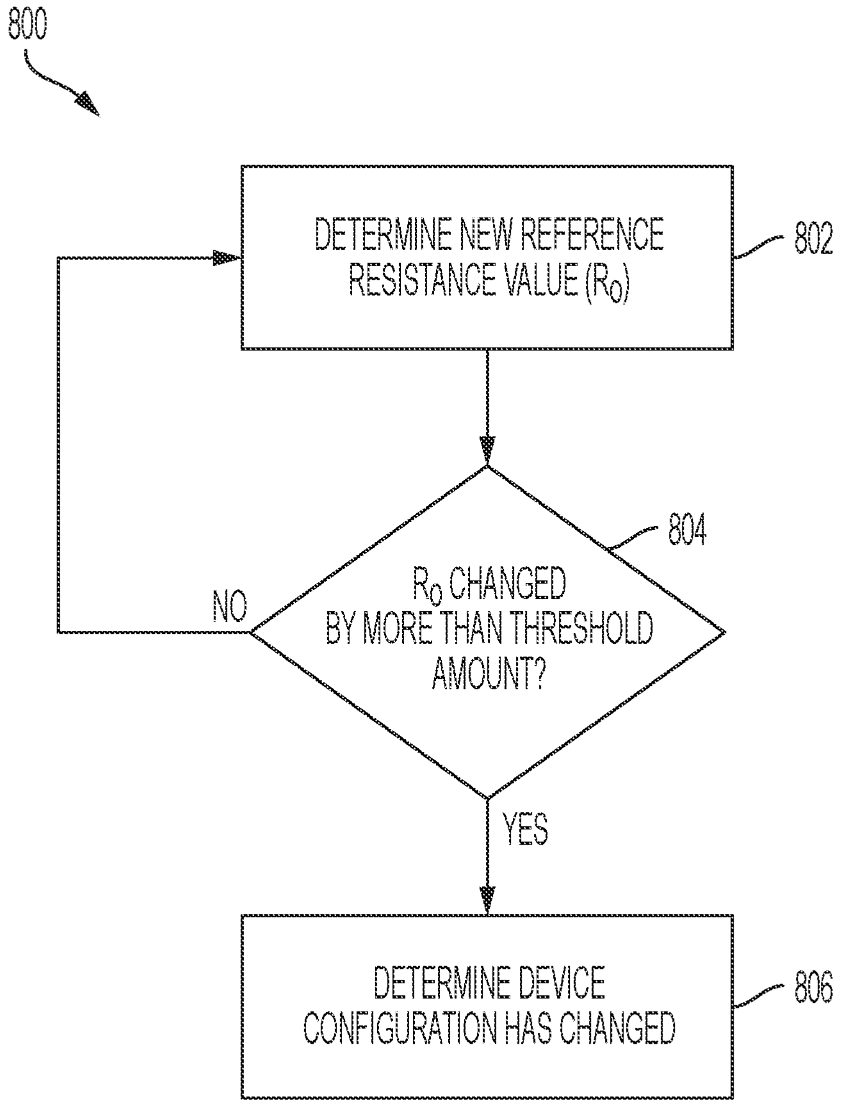
FIG. 8 is a flow chart illustrating an example method for executing a recalibration that determines the reference resistance value of the loudspeaker according to some embodiments of the disclosure.

In some embodiments, the reference resistance value $R_0$ may be measured at certain times indicated by a trigger condition and/or measured periodically. FIG. 8 is a flow chart illustrating an example method for executing a recalibration that determines the reference resistance value $R_0$ of the loudspeaker according to some embodiments of the disclosure. A method 800 includes, at block 802, determining a new reference resistance value $R_0$. At block 804, the reference resistance value $R_0$ of block 802 is compared to a previous reference resistance value $R_0$. If the difference is smaller than a threshold amount, the method 800 may be repeated at another time by returning to block 802. If the difference is greater than a threshold amount, the method 800 determines, at block 806, that the device configuration has changed (e.g., a loudspeaker or mainboard has been replaced).

Embodiments of this disclosure relate to speaker protection circuitry for thermal protection of a loudspeaker, such as to limit the voice coil temperature within safe limits by modulating gain of a drive signal used for exciting a loudspeaker with an audio signal to reproduce sounds. The protection circuitry may determine an estimate of the power dissipated in the loudspeaker and the present voice coil temperature, based in part on the reference resistance value $R_0$, to determine an acceptable power limit. The gain of the drive signal to the loudspeaker may be reduced based on the relative level of present power dissipation and the acceptable power limit.

Figure 9:
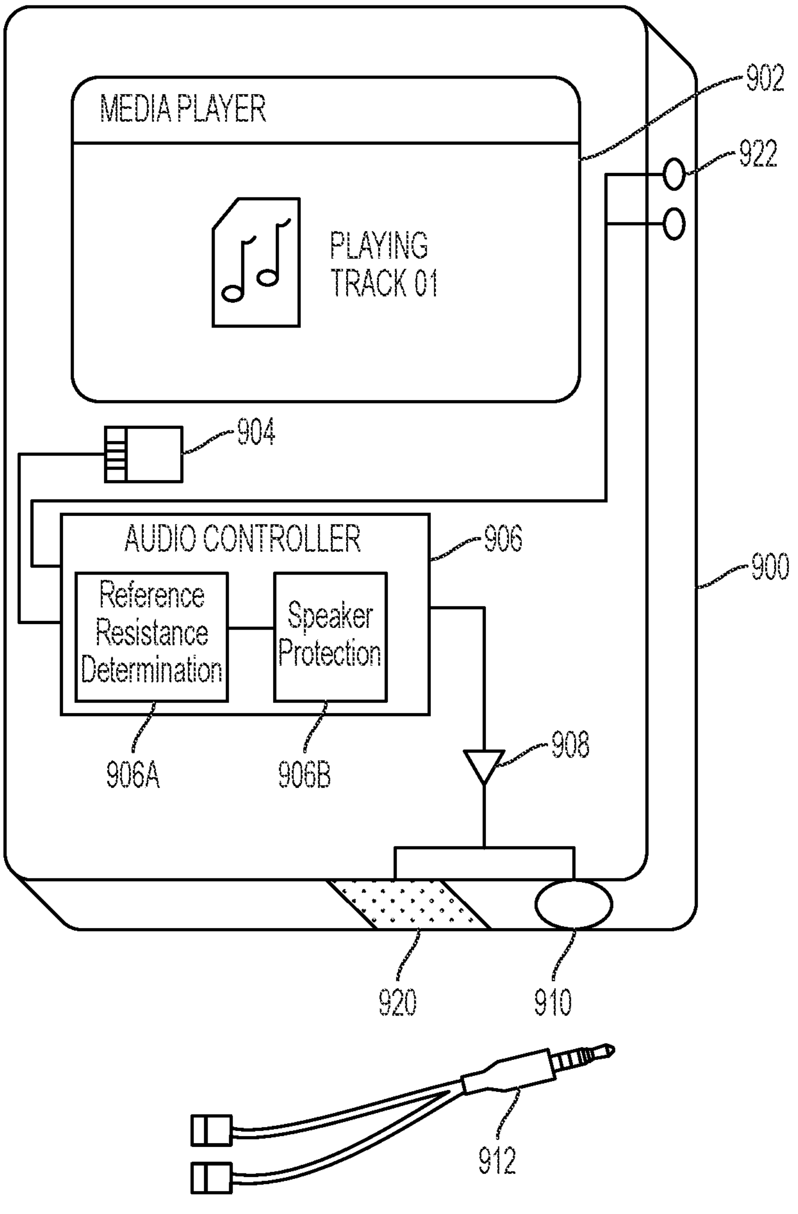
FIG. 9 is a perspective view illustrating an example mobile device with an audio controller for determining a reference resistance value of a loudspeaker according to some embodiments of the disclosure.

Such speaker protection circuitry may be implemented in an electronic apparatus or device 900 as illustrated in FIG. 9. One advantageous embodiment for an audio controller described herein is a personal media device for playing back music, high-fidelity music, and/or speech from telephone calls. FIG. 9 is a perspective view illustrating an example mobile device with an audio controller for determining a reference resistance value of a loudspeaker according to some embodiments of the disclosure. A device 900 may include a display 902 for allowing a user to select from music files for playback, which may include both high-fidelity music files and normal music files. When music files are selected by a user, audio files may be retrieved from memory 904 by an application processor (not shown) and provided to an audio controller 906. The audio controller 906 may include reference resistance determination 906A for determining a reference resistance of a loudspeaker, such as internal speaker 920 or headphones 912. The digital audio (e.g., music or speech) may be converted to analog signals by the audio controller 906, and those analog signals amplified by an amplifier 908. The audio controller 906 may implement volume control using user input received from volume rocker 922 or user input to the display 902 to indicate a desired volume level. The desired volume level may be used to control gain at the amplifier 908. The audio controller 906 may also include speaker protection 906B, which uses the determined reference resistance value to adjust the gain setting of amplifier 908 to protect the internal speaker 920 and/or headphones 912. The amplifier 908 may be coupled to an audio output 910, such as a headphone jack, for driving a transducer, such as the headphones 912. The amplifier 908 may also be coupled to the internal speaker 920 of the device 900. Although the data received at the audio controller 906 is described as received from memory 904, the audio data may also be received from other sources, such as a USB connection, a device connected through Wi-Fi to the device 900, a cellular radio, an Internet-based server, another wireless radio, and/or a wired connection.

The schematic flow chart diagrams of FIG. 1 and FIG. 8 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general-purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. For example, although processors or controllers are described throughout the detailed description, aspects of the invention may be implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As a further example, although adjustment of operation of a loudspeaker is described as adjusted based on a determined reference resistance value of a loudspeaker, operation of other devices may be based on a reference resistance value determined in a similar manner, such as with haptic devices. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:

applying a first signal to a loudspeaker;

measuring a voltage and a current for the loudspeaker while applying the first signal to the loudspeaker; and determining a reference resistance for the loudspeaker based on the voltage and the current, wherein determining the reference resistance is part of a recalibration of the loudspeaker.

2. The method of claim 1, wherein determining the reference resistance comprises determining a thermal model for the loudspeaker based on the voltage and the current.

3. The method of claim 2, wherein determining the reference resistance comprises determining parameters for the thermal model for the loudspeaker by adapting an adaptive filter based on a response of the loudspeaker to the first signal, wherein the reference resistance is based on at least one parameter of the adaptive filter.

4. The method of claim 3, wherein adapting the adaptive filter comprises:

applying an input power signal to the adaptive filter corresponding to input power applied to the loudspeaker during the applying the first signal to the loudspeaker, and adapting a first parameter and a second parameter of the adaptive filter based on a resistance of the loudspeaker determined from the voltage and the current for the loudspeaker, wherein the first parameter corresponds to a scaling factor for a relationship between resistance and power in the thermal model and the second parameter corresponds to a time constant for the relationship between resistance and power in the thermal model, and wherein determining the reference resistance is based on the first parameter.

5. The method of claim 1, wherein measuring the voltage and the current for the loudspeaker while applying the first signal to the loudspeaker comprises:

measuring a first voltage and a first current at a first time; and measuring a second voltage and a second current at a second time after the first time; and wherein determining the reference resistance comprises:

determining a first resistance at the first time corresponding to a first temperature;

determining a second resistance at the second time corresponding to a second temperature;

determining an ambient temperature value based on a difference between the first resistance and the second resistance; and determining the reference resistance based on the ambient temperature value and the first resistance.

6. The method of claim 5, wherein determining the ambient temperature value comprises determining the ambient temperature value from a predetermined linear relationship between resistance and temperature.

7. The method of claim 1, wherein the method further comprises:

determining a first excursion estimate based on the at least one of a voltage between or a current through two terminals of the loudspeaker;

applying a second signal to the loudspeaker;

measuring at least one of a second voltage between or a second current through the two terminals of the loudspeaker while applying the second signal to the loudspeaker;

determining a second excursion estimate based on the at least one of a second voltage between or a second current through two terminals of the loudspeaker; and determining to execute the recalibration of the loudspeaker based on the first excursion estimate and the second excursion estimate meeting a criteria.

8. The method of claim 7, wherein the first signal and the second signal comprise a high frequency tone configured to monitor an impedance in an inductive region of the loudspeaker.

9. The method of claim 1, further comprising:

receiving audio data for reproduction by the loudspeaker;

generating an audio signal based on the audio data;

modifying the audio signal based on the reference resistance to determine an output signal, wherein the modifying is based on a thermal protection algorithm; and applying the output signal to the loudspeaker.

10. The method of claim 1, wherein applying the first signal to the loudspeaker comprises applying a tone signal to the loudspeaker.

11. The method of claim 1, wherein determining the reference resistance is performed without reference to a temperature value.

12. An apparatus, comprising:

an audio controller configured to perform steps comprising:

applying a first signal to a loudspeaker;

measuring a voltage and a current for the loudspeaker while applying the first signal to the loudspeaker; and determining a reference resistance for the loudspeaker based on the voltage and the current, wherein determining the reference resistance is part of a recalibration of the loudspeaker.

13. The apparatus of claim 12, wherein determining the reference resistance comprises determining a thermal model for the loudspeaker based on the voltage and the current.

14. The apparatus of claim 13, wherein determining the reference resistance comprises determining parameters for the thermal model for the loudspeaker by adapting an adaptive filter based on a response of the loudspeaker to the first signal, wherein adapting the adaptive filter comprises:

applying an input power signal to the adaptive filter corresponding to input power applied to the loudspeaker during the applying the first signal to the loudspeaker, and adapting a first parameter and a second parameter of the adaptive filter based on a resistance of the loudspeaker determined from the voltage and the current for the loudspeaker, wherein the first parameter corresponds to a scaling factor for a relationship between resistance and power in the thermal model and the second parameter corresponds to a time constant for the relationship between resistance and power in the thermal model, and wherein the reference resistance is based on at least the first parameter.

15. The apparatus of claim 12, wherein measuring the voltage and the current for the loudspeaker while applying the first signal to the loudspeaker comprises:

measuring a first voltage and a first current at a first time; and measuring a second voltage and a second current at a second time after the first time; and wherein determining the reference resistance comprises:

determining a first resistance at the first time corresponding to a first temperature;

determining a second resistance at the second time corresponding to a second temperature;

determining an ambient temperature value based on a difference between the first resistance and the second resistance and a predetermined linear relationship between resistance and temperature; and determining the reference resistance based on the ambient temperature value and the first resistance.

16. The apparatus of claim 12, wherein the audio controller is further configured to perform steps comprising:

determining an audio signal for reproduction by the loudspeaker;

modifying the audio signal based on the reference resistance to determine an output signal, wherein the modifying is based on a thermal protection algorithm; and applying the output signal to the loudspeaker.

17. A mobile device, comprising:

a loudspeaker;

a memory; and an audio controller coupled to the memory, the audio controller also coupled to the loudspeaker and configured for outputting sounds through the loudspeaker based on audio data stored in the memory, the audio controller further configured to perform thermal protection for the loudspeaker based on a reference resistance value determined by performing steps comprising:

applying a first signal to the loudspeaker;

measuring a voltage and a current for the loudspeaker while applying the first signal to the loudspeaker; and determining the reference resistance value for the loudspeaker based on the voltage and the current, wherein determining the reference resistance value is part of a recalibration of the loudspeaker.

18. The mobile device of claim 17, wherein determining the reference resistance value comprises determining a thermal model for the loudspeaker based on the voltage and the current.

19. The mobile device of claim 18, wherein determining the reference resistance value comprises determining parameters for the thermal model for the loudspeaker by adapting an adaptive filter based on a response of the loudspeaker to the first signal, wherein adapting the adaptive filter comprises:

applying an input power signal to the adaptive filter corresponding to input power applied to the loudspeaker during the applying the first signal to the loudspeaker, and adapting a first parameter and a second parameter of the adaptive filter based on a resistance of the loudspeaker determined from the voltage and the current for the loudspeaker, wherein the first parameter corresponds to a scaling factor for a relationship between resistance and power in the thermal model and the second parameter corresponds to a time constant for the relationship between resistance and power in the thermal model, and wherein the reference resistance value is based on at least the first parameter.

20. The mobile device of claim 17, wherein measuring the voltage and the current for the loudspeaker while applying the first signal to the loudspeaker comprises:

measuring a first voltage and a first current at a first time; and measuring a second voltage and a second current at a second time after the first time; and wherein determining the reference resistance value comprises:

determining a first resistance at the first time corresponding to a first temperature;

determining a second resistance at the second time corresponding to a second temperature; and determining an ambient temperature value based on a difference between the first resistance and the second resistance and a predetermined linear relationship between resistance and temperature; and determining the reference resistance value based on the ambient temperature value and the first resistance.

* * * * *